US009407959B2

(12) United States Patent
Vass (10) Patent No.: US 9,407,959 B2
(45) Date of Patent: Aug. 2, 2016

(54) MONITORING BEHAVIOR WITH RESPECT TO A SOFTWARE PROGRAM (75) Inventor: Jozsef Vass, Los Gatos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1676 days.

(21) Appl. No.: 12/563,973

(22) Filed: Sep. 21, 2009

(65) Prior Publication Data
US 2013/0166520 A1 Jun. 27, 2013

(51) Int. Cl.
G06F 17/30 (2006.01)
H04N 21/442 (2011.01)
G06F 21/10 (2013.01)
H04N 21/2387 (2011.01)

(52) U.S. Cl.
CPC .... H04N 21/44236 (2013.01); G06F 17/30781 (2013.01); G06F 21/10 (2013.01); H04N 21/2387 (2013.01); H04N 21/44222 (2013.01)

(58) Field of Classification Search
None
See application file for complete search history.

(56) References Cited

U.S. PATENT DOCUMENTS

| 5,732,275 | A * | 3/1998 | Kullick et al. ............... 717/170 |
| 6,317,742 | B1 | 11/2001 | Nagaratnam et al. |
| 6,339,423 | B1 | 1/2002 | Sampson et al. |
| 6,687,745 | B1 | 2/2004 | Franco et al. |
| 6,772,350 | B1 | 8/2004 | Belani et al. |
| 6,851,060 | B1 | 2/2005 | Shrader |
| 6,938,047 | B2 | 8/2005 | Kryeziu |
| 7,228,359 | B1 * | 6/2007 | Monteiro ...................... 709/245 |
| 7,496,676 | B2 | 2/2009 | Kryeziu |
| 7,770,202 | B2 | 8/2010 | Brumme et al. |
| 2002/0091798 | A1 | 7/2002 | Joshi et al. |
| 2002/0161996 | A1 * | 10/2002 | Koved et al. ................ 713/150 |
| 2003/0041267 | A1 | 2/2003 | Fee et al. |
| 2003/0093666 | A1 | 5/2003 | Millen et al. |
| 2003/0149781 | A1 | 8/2003 | Yared et al. |
| 2003/0182100 | A1 * | 9/2003 | Plastina et al. ................ 704/1 |
| 2004/0002878 | A1 | 1/2004 | Maria |
| 2004/0003293 | A1 | 1/2004 | Viets et al. |
| 2004/0210536 | A1 | 10/2004 | Gudelj et al. |
| 2005/0172122 | A1 | 8/2005 | Risan et al. |
| 2005/0172286 | A1 | 8/2005 | Brumme et al. |
| 2006/0085789 | A1 | 4/2006 | Laborczfalvi et al. |

(Continued)

OTHER PUBLICATIONS

Adobe Systems Incorporated, "SWF File Format Specification Version 10," Copyright 2006-2008 Adobe Systems Incorporated, published Nov. 2008, pp. 1-278.

(Continued)

Primary Examiner — Miranda Huang
(74) Attorney, Agent, or Firm — Wolfe-SBMC (57) ABSTRACT Methods, systems, and apparatus, including computer programs encoded on a computer storage medium, used to monitor behavior with respect to a software program. In one aspect, a method includes playing media content using a first program that is limited to a first security context corresponding to a first domain of the first program, the first program having an object in the first security context corresponding to the media content; receiving an event including information indicating a monitoring program; instantiating the monitoring program in a second security context that is applicable to multiple domains, including the first domain, the instantiated monitoring program having access from the second security context to the object of the first program in the first security context; and receiving from the monitoring program information regarding playing of the media content.

17 Claims, 6 Drawing Sheets (56) References Cited

U.S. PATENT DOCUMENTS

| | | | |
|---|---|---|---|
| 2008/0235580 A1 | 9/2008 | Gonze et al. | |
| 2008/0256431 A1 | 10/2008 | Hornberger | |
| 2008/0263579 A1* | 10/2008 | Mears et al. | 725/9 |
| 2008/0320596 A1* | 12/2008 | Wang | G06F 21/10 726/26 |
| 2012/0179664 A1* | 7/2012 | Auerbach | G06F 17/30038 707/708 |

OTHER PUBLICATIONS

Yanet, Rodriguez, U.S. Appl. No. 12/475,115, Media Content Including Introduced Code, filed May 29, 2009, 34 pages.

Meketa, Deneb, U.S. Appl. No. 11/677,557, Application Management, filed Feb. 21, 2007, 33 pages.

Meketa, Deneb, U.S. Appl. No. 11/213,184, System and Method for Controlling Access to Files, filed Aug. 25, 2005, 87 pages.

Sun Deveoper Network (SDN), Apple Security, http://java.sun.com/sfaq/.

Adobe, Video File Format Specification, Version 10, 2008, Adobe Systems Incorporated, 48 pages.

The Base Java Security Model: The Original Applet Sandbox, Section 7—The Class Loader Architecture—http://www.securingjava.com/chapter-two/chapter-two-7.html (6 pages).

Sun Developer Network (SDN), Applet Security, http://java.sun.com/sfaq/.

Yanet, Rodriguez, U.S. Appl. No. 12/475,115, Media Content Including Introduced Code, filed May 29, 2009, 34 pages, to be published by USPTO.

Meketa, Deneb, U.S. Appl. No. 11/677,557, Application Management, filed Feb. 21, 2007, 33 pages, to be published by USPTO.

Meketa, Deneb, U.S. Appl. No. 11/213,184, System and Method for Controlling Access to Files, filed Aug. 25, 2005, 87 pages, to be published by USPTO.

* cited by examiner

MONITORING BEHAVIOR WITH RESPECT TO A SOFTWARE PROGRAM

BACKGROUND

This specification relates to monitoring behavior with respect to a software program, such as a media player application.

The Internet is widely used to distribute multimedia information, including video and audio data. Such information can be downloaded as a file, or streamed to a client computer, where a media player or real-time communications application can process and output the media content to a display device and one or more speakers. The media player or real-time communications application can be a program written for a particular operating system (OS) on a computer platform. Alternatively, the media player or real-time communications application can be platform-independent software that runs inside another program, such as a runtime environment, on a computer platform. For example, a FLASH® multimedia player program can play streamable content by running in a FLASH® runtime or an AIR® runtime environment provided by Adobe Systems Incorporated of San Jose, Calif., and using the runtime to render the media content to appropriate output devices. Moreover, the runtime environment can itself be a plug-in to another program, such as a Web browser program.

In addition, media content can include associated metadata that provides information about the content to be rendered. Examples of metadata include author, publication and licensing information. Moreover, metadata can also include references to pre-exiting functions implemented in the media player itself that perform certain actions, such as recording information about media viewing patterns, showing an advertisement to a current viewer of the media content being rendered, or sending information to another computer accessible over the Internet for aggregation and analysis of media viewing statistics.

The media player can run inside a runtime environment, or an application execution environment, which is a virtualization environment that works in conjunction with the native services (e.g., an operating system) of a computing device to provide a consistent well-defined environment in which applications can be loaded and executed. An application execution environment typically includes facilities such as memory management (e.g., garbage collection), standard libraries, media decoders, user interface frameworks and input-output interfaces. An application designed to run within an application execution environment can often be developed rapidly because developers can rely on the consistency of the application execution environment—even if the environment itself exists on widely varying systems. Security features within the runtime environment can provide built-in safety mechanisms to ensure that applications do not pose a threat to the platform upon which they are executed. For example, an application may require a security check to access a remote network or certain local resources.

An application execution environment can load an application from an encoded representation of the application. For example, the encoded representation can have a pre-defined syntactic structure such as a programming language (e.g., source code) or can include well-defined virtual instructions (e.g., platform-independent bytecode, such as Macromedia Flash® bytecode). To load applications, the application execution environment decodes the encoded representation of the application into instructions and executes the instructions of the application. Application execution environments are sometimes referred to as interpreters or virtual machines.

When the loaded application is executed, the application execution environment controls the resources that the application is allowed to access. For example, if an application is downloaded from the Internet, the application may be allowed to display information and receive user input, but may not be allowed to access an attached storage device. An application can be classified such that the application's classification identifies a particular security context within the execution environment with which the application is loaded. An application that has a different classification is loaded into a different security context. An application loaded using one security context is prevented from accessing, modifying or interfering with an application loaded using a different security context. For example, the source Internet domain (e.g., "some-made-up-company.com") for each application can be used to classify the application into a corresponding security context, thereby isolating applications from different source domains. However, it is often desirable for an author of an application to reuse functionality of one application within another application, even if the two applications do not share the same classification.

Some application execution environments allow applications to explicitly establish inter-isolation-environment communication channels. Typically one or both of the applications must be explicitly designed to exchange data through an established channel. For example, when a SWF application is loaded into the FLASH® runtime, it is placed into its natural security context corresponding to the Uniform Resource Locator (URL). SWF is a file format, such as the SWF File Format Specification (Version 10) as published (see adobe.com/devnet/swf/pdf/swf_file_format_spec_v10.pdf) by Adobe Systems Incorporated of San Jose, Calif. An object of this application may load another SWF application from any allowed source, and the loaded SWF can be placed in either its own natural security context or the loader's security context. If the loader and loaded SWF applications are in different security domains, they must give explicit permission to access each other's data. Thus, in the context of program monitoring (e.g., monitoring performance and/or usage) the main SWF application explicitly loads the monitoring SWF application and gives permission to access certain information. The main SWF application may also have to pass certain parameters explicitly to the monitoring object to support the monitoring process.

SUMMARY

This specification describes technologies relating to monitoring behavior with respect to a software program, such as a media player application.

In general, one innovative aspect of the subject matter described in this specification can be embodied in methods that include the actions of playing media content using a first program that is limited to a first security context corresponding to a first domain of the first program, the first program having an object in the first security context corresponding to the media content; receiving an event including information indicating a monitoring program; instantiating the monitoring program in a second security context that is applicable to multiple domains, including the first domain, the instantiated monitoring program having access from the second security context to the object of the first program in the first security context; and receiving from the monitoring program information regarding playing of the media content. Other embodiments of this aspect include corresponding systems, apparatus, and computer programs, configured to perform the actions of the methods, encoded on computer storage devices.

These and other embodiments can each optionally include one or more of the following features. The method can include: providing the instantiated monitoring program in the second security context with access to a display list of the first program in the first security context; and allowing the instantiated monitoring program in the second security context to send information to domains other than the first domain. The method can include: sending a domain name service (DNS) request including a domain name corresponding to the information indicating the monitoring program; receiving a response to the DNS request; and controlling the instantiating based on the response.

The method can include: sending a secure request for a remote document containing version information; receiving a copy of the remote document; comparing the version information in the copy of the remote document with locally retained version information for the monitoring program; when the comparing indicates a newer version of the monitoring program is available downloading the newer version of the monitoring program, saving the newer version of the monitoring program in a cross-domain cache serving as a source for the instantiating, and updating the locally retained version information for the monitoring program; and controlling the instantiating based on a match between the locally retained version information for the monitoring program and version information contained within the monitoring program.

The first program can include bytecode of a first type, and the monitoring program can include bytecode of the first type; the method can include providing a network connection to the monitoring program through which the information is received and forwarded over a network to another computer for aggregation and analysis; and playing the media content, receiving the event, instantiating the monitoring program, and providing the network connection can be performed by a runtime environment in which a media player application operates. Moreover, receiving the event can include receiving in a multi-media stream the information indicating the monitoring program, where the multi-media stream includes the media content.

Other innovative aspects of the subject matter described in this specification can be embodied in a computer storage medium encoded with a computer program including instructions that when executed by data processing apparatus cause the data processing apparatus to perform operations as described. In addition, a system can include a device; and one or more computers operable to interact with the device and to perform operations as described, where the device can include a mobile telephone including the one or more computers. Moreover, the one or more computers can consist of one computer, the device can be a user interface device, and the one computer can include the user interface device.

Particular embodiments of the subject matter described in this specification can be implemented so as to realize one or more of the following advantages. Program monitoring (e.g., monitoring performance and/or usage) can be modified by changing a monitoring program that operates with a main application, without requiring changes to the main application. A monitoring program object can be instantiated by a runtime environment (e.g., the FLASH® runtime provided by Adobe Systems Incorporated of San Jose, Calif.) and monitor a main program while remaining transparent to the main program (e.g., the object need not be included in the display list and need not interfere with the main program in any way). The monitoring program can be agnostic with respect to the main program's domain, and thus the monitoring program can collect information specific to the computer and/or user and not the website that is being visited.

The monitoring program can run in a defined security context that provides the monitoring program with special privileges, such as access to software objects and a display list in the main program's security context. The special privilege can also allow the monitoring program to bypass URL/socket policy file checks. Moreover, some implementations can employ techniques to control instantiation and updating of the monitoring program, which can result in rapid update checks with reduced network impact. In addition, the update process can avoid reliance on a browser cache, prevent monitoring program downgrade or partial update due to man-in-the-middle attack, and provide a secure update process without risking substantial download spikes.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

An electronic document (which for brevity will simply be referred to as a document) may, but need not, correspond to a file. A document may be stored in a portion of a file that holds other documents, in a single file dedicated to the document in question, or in multiple coordinated files.

Figure 1:
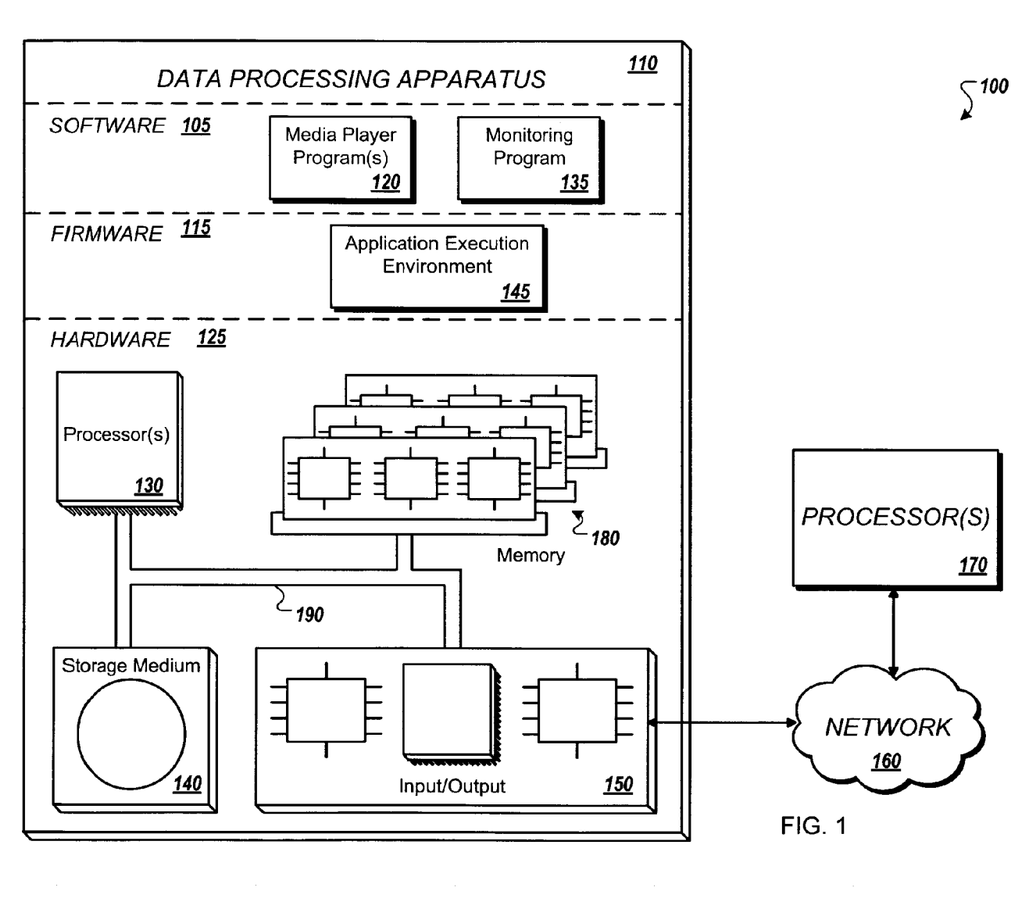
FIG. 1 is a block diagram showing an example of a computer system including one or more media player programs.

FIG. 1 is a block diagram showing an example of a computer system 100 including one or more media player programs 120. A data processing apparatus 110 can include hardware 125, firmware 115 and one or more software programs 105, including the media player program(s) 120. The media player program(s) 120 operate in conjunction with the data processing apparatus 110 to effect various operations described in this specification. The media player program(s) 120, in combination with the various hardware 125, firmware 115, and software 105 components of the data processing apparatus 110, represent one or more structural components in the system 100, in which the algorithms described herein can be embodied.

The media player program(s) 120 can be one or more applications for processing and outputting media content (e.g., audio, video, graphical, and/or textual data) to one or more output devices such as a display device and one or more speakers. The media player program(s) 120 can include media player or real-time communications applications, or any program that plays back media, whether in real-time or non-real-time. An application refers to a computer program that the user perceives as a distinct computer tool used for a defined purpose. An application can be built entirely into an operating system or other operating environment, or it can have different components in different locations (e.g., a remote server). The media player program(s) 120 can include or interface with other software. The media player program(s) 120 can include a stand alone media player program, a media player program that relies on a runtime environment to operate (e.g., a JAVA® virtual machine or an Adobe AIR® runtime environment), or multiple different media player programs, which can be stand alone or runtime environment-based.

Interface software can also be included that operates over a network to interface with other processor(s), such as in a computer used by a digital content provider. For example, the media player program(s) 120 can include software methods for sending information to another computer accessible over the Internet for aggregation and analysis of media viewing statistics.

The hardware level 125 of the data processing apparatus 110 includes one or more processors 130, a memory 180, and at least one computer-readable medium 140 (e.g., random access memory, storage device, etc.). The hardware level 115 can also include one or more input/output devices 150, including one or more user interface devices.

Each of the components 130, 140, 150, and 180 are interconnected using a system bus 190. The processor(s) 130 can process instructions for execution within the system 100. In some implementations, one or more single-threaded processors can be included within the processor(s) 130. In other implementations, one or more multi-threaded processors can be included within the processor(s) 130. In some implementations, the processor(s) 130 can process instructions stored in the memory 180, or on a storage device 140, to display graphical information for a user interface on one of the input/output devices 150.

The memory 180 can be a computer-readable medium used to store information within the system 100 and can include a volatile memory unit, a non-volatile memory unit, or both. The storage device 140 can provide mass storage for the system 100. The storage device 140 can include a floppy disk device, a hard disk device, an optical disk device, or a tape device.

The input/output devices 150 provide input/output operations for the system 100. The input/output devices 150 can include a keyboard, mouse, stylus or pointing device, a display unit for displaying graphical user interfaces, a modem or other networking hardware/firmware, or any combination thereof to name a few examples.

The subject matter described in this specification can also be used in conjunction with other input/output devices, such as a printer or scanner. An input/output device can be used to connect to a network 160, and can furthermore connect to one or more processors 170 via the network 160 (e.g., the Internet, a private network, a mobile computer network, or combinations thereof).

Therefore, a user of the media player program(s) 120 does not need to be local, and may be connecting to the data processing apparatus 110 in a wired or wireless fashion using an internet or intranet connection on a personal computer, personal digital assistant (PDA), smartphone (e.g., a cellular phone including an operating system and advanced computing capabilities), or using other suitable hardware and software at a remote location. For example, a user can access a web interface via the remote processor 170 in order to view media content. In any event, data can be transmitted over the network 160 to/from the data processing apparatus 110. Note that the data processing apparatus 110 can itself be considered a user interface device (e.g., when the media player program(s) 120 is delivered by processor(s) 170 as a web service).

The system 100 can be used to render media content that introduces code having a trigger to launch a monitoring program 135, which can be previously downloaded, delivered along with media content to be rendered or otherwise provided through the network 160 (e.g., retrieved from a remote source based on information provided along with the media content). The monitoring program 135 can allow the provider or distributor of the media content to collect information regarding the consumption of the media content. For example, the monitoring program 135 can include processes for collecting information regarding the consumption of media content being rendered upon the media player program(s) 120 and for providing the collected information to one or more devices connected to the network 160. The collected data, in some examples, can be aggregated and the aggregated statistics reviewed to provide user recommendations or contextual advertisement placement.

In some implementations, the trigger within the rendered media content can instantiate the monitoring program 135 without affecting the media player program(s) 120.

The monitoring program 135 may be used, in some implementations, with any type of media player program because the functionality of the monitoring program 135 is agnostic to the media player program(s) 120. Similarly, the version of the media player program(s) 120 may be updated without affecting the performance of the monitoring program 135 and vice versa. The monitoring program 135, in some examples, can include ActionScript (AS) or SWF code.

The monitoring program 135 and/or the media player program(s) 120, in some implementations, can be instantiated within an application execution environment 145 which can provide a virtualized platform-independent foundation for the monitoring program 135 and/or the media player programs(s) 120 to relate to the underlying operating system of the computer system 100. Note that although the application execution environment 145 is shown as residing entirely in firmware 115, some or all of the application execution environment 145 can reside in software 105. Moreover, variations in the placement of the program(s) 120 and the monitoring program 135 are also possible.

Figure 2:
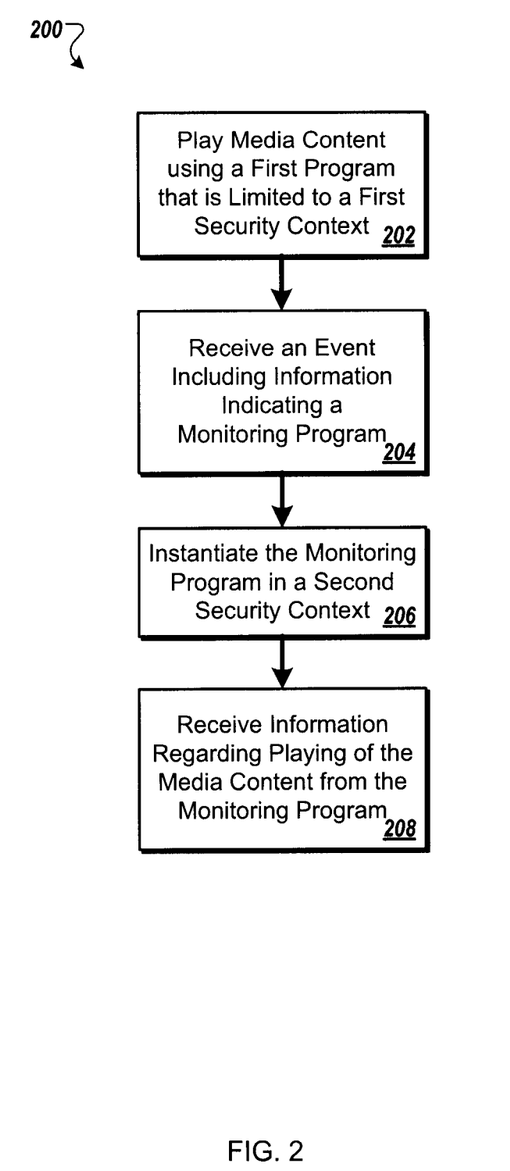
FIG. 2 is a flowchart showing an example of a process of monitoring behavior with respect to a software program.

FIG. 2 is a flowchart showing an example of a process 200 of monitoring behavior with respect to a software program. The process 200, for example, may be executed within a runtime environment on which a media player program, such as the media player program 120 as described in relation to FIG. 1, is being executed to present the media content.

The process 200 begins with playing media content using a first program that is limited to a first security context (202). When a program is loaded for execution by a runtime environment, the program can be allocated to a security context. In general, a program can have a domain classification which identifies a particular security context within the execution environment into which the program is loaded as an executable application. A second program that has a different domain classification is loaded into a different security context. A program loaded using one security context may be prevented from accessing, modifying or interfering with an application loaded using a different security context. The security context includes privileges and capabilities associated with all applications instantiated within that security context. The security context can define a virtual resource allocation to protect the remainder of the information available within the data processing apparatus from malicious access. If two or more applications are instantiated within the same security context, the applications may share information and resources. If two applications are instantiated within different security contexts, the applications typically are not able to share information and resources without having been initialized with express permission for each application to access the other.

The first program, such as a media player application, is limited to a first security context. While playing the media content, the first program utilizes resources available within the first security context. The media content can include both media data and associated data. The media data and/or associated data within the media content include incremental time codes (e.g., with respect to the beginning of the media content) referring to the relative execution of individual portions of the multimedia content (e.g., present this section of video at the same time as this section of audio). The media data and associated data, in some examples, can originate from a multimedia electronic document such as an MP4 (MPEG-4, Moving Picture Experts Group—4) document, Moving Picture Experts Group formatted document (e.g., MPEG-1, MPEG-2, or MPEG-4), or Adobe Flash Video (FLV, F4V) document.

In some implementations, the media data and associated data can be supplied to the process 200 as a stream of two or more unique media tracks or as a single multiplexed stream of two or more unique media tracks. The media data and associated data, in some examples, opened by a media player program from a local file, created by a voice recording program which then renders the content in a playback mode, or delivered from a networked content delivery service to a media player program.

One or more objects associated with the media content, such as a display list, may be temporarily stored within the first security context by the first program. The first program may temporarily store other objects within the first security context, such as a NetConnection object or a display list.

An event is received including information indicating a monitoring program (204). The event, in some implementations, may include a trigger embedded within the associated data of the media content. The associated data, for example, can be reviewed to detect a marker identifying a trigger introduced by the associated data. A marker, in general terms, can be used to identify a function call. The function call, in some examples, can be targeted for acknowledgement by the media player or by the runtime environment. The media player and/or the runtime environment can execute upon recognized function calls, in some examples, to insert an advertisement into the execution of the multimedia content, to collect data regarding the execution of the multimedia content, or to deliver collected statistics to a network device. In some implementations, if the media player does not recognize a function call identified by a marker, the media player ignores the function call. In addition, a marker identifying a trigger within the associated data can provide a cue regarding the instantiation of a monitoring program or provide a cue to download a monitoring program from a networked computing device.

The trigger may have been introduced into the media content by the content provider or the content server to enable the collection of statistics regarding the consumption of the media content. In other implementations, the trigger may originate from the first program. For example, upon playback, a voice recording program may trigger the monitoring program to monitor the quality of the recording. The trigger, in some examples, can include a Uniform Resource Locator (URL) where the monitoring program can be accessed, or information which can be used to form a URL (e.g., information describing a portion of a URL to be added to another portion of a URL previously coded into the media player or the runtime environment).

In some implementations, the monitoring program can be written in a bytecode format, which is abstracted from the type of media player or computer device that is executing the program code. In some examples, the program code may be coded in Java Virtual Machine (JVM) bytecode or in an Adobe Flash file format such as SWF, Flash Video (FLV, F4V), or AS. In other implementations, the program code may be written in the same language as the media player, or within a language recognized by the computer device operating system, and/or the runtime environment.

The monitoring program is instantiated in a second security context that is applicable to multiple domains, including the first domain (206). The monitoring program, in some examples, can be downloaded from a remote site or launched from a document stored within the local data processing apparatus. The second security context provides the monitoring program with security access and permissions to obtain information available within the first security context.

Certain application execution environments can allow applications to explicitly establish inter-security context communication channels. Typically one or both of the applications are explicitly designed to exchange data through an established channel. For example, the monitoring program can be aware that the media player program is instantiated within the first security context, and the monitoring program can further be designed to exchange data with the first security context through a communication channel. This design method may limit the types of media player applications which can be monitored, because the monitoring program would be programmed to interact with each anticipated security context associated with each anticipated media player (e.g., Adobe Flash Player by Adobe Systems Incorporated of San Jose, Calif.; Hulu Desktop by Hulu LLC of Los Angeles, Calif.; Windows Media Player by Microsoft Corp. of Redmond, Wash.; or Quicktime by Apple Inc. of Cupertino, Calif.; etc.).

The second security context can be a cross-domain context. By establishing an application within the cross-domain context, the application can interact with multiple other security contexts (potentially all other security contexts). Due to this flexibility, the monitoring program can access information local to the media player program regardless of the security context surrounding the media player. The monitoring program would not necessarily be aware of the different types of potential media players, and the media players need not be specifically programmed to communicate with the monitoring program.

If the monitoring program was previously invoked, the executable code for the monitoring program can be stored within a cross-domain cache. In this way, the monitoring program can be stored for reuse rather than being downloaded from a remote site whenever it is invoked by a trigger within media content. The cross-domain cache can be a secure storage area, and thus the code of the monitoring program can be instantiated at a later time by running a verification method (such as a digital signature authentication or user authorization) and run upon successful verification.

Information is received regarding the playing of the media content from the monitoring program (208). During consumption of the media content, in some implementations, the monitoring program can receive events and actions from the runtime environment. The monitoring program can collect data during the rendering of the media content based upon the received actions and events. The data, for example, can include information indicating one or more actions taken by a user during the rendering of the media content. In some examples, the information can include identification of the portion of the media content displayed (e.g., the first 120 frames, the full video, etc.), identification of any portion(s) of the media content played more than once by the user, or identification of any portion(s) of the media content paused upon by the user. Each action or event collected as data, in some implementations, can be associated with a time stamp indicating when the data was collected. The collected data can, in further examples, include metadata associated with the media data rendered such as, in some examples, information identifying the media content, information identifying sections of the media content (e.g., one or more advertisements appended within a video content), quality of service (QOS) settings associated with the rendering of the media content, media player settings during rendering of the media content (e.g., full screen mode, subtitles, volume level, mute, etc.) or bookmarks associated with the media content.

In some implementations, the monitoring program retrieves information from objects stored by the media player. For example, the media player may retrieve information regarding the rendered media content from a play list stored by the media player within the first security context. In other implementations, the monitoring program taps into a streaming data channel (e.g., a NetStream as established between an Adobe Flash Player and a Flash Media Server through a NetConnection) to read metadata associated with the rendered media content and the manner in which the content is being rendered (e.g., display size, play duration, media content creator, etc.).

In some implementations, one or more of the actions or events, such as pause or stop, may be used by the monitoring program as a cue to execute one or more commands. For example, the monitoring program may temporarily store collected data within a local storage area, and, upon indication of a stop event, the monitoring program may transmit the collected data to a remote server. For example, the monitoring program may open an Internet connection to provide collected data to a server. In other implementations, collected data can be transmitted to a remote server on a periodic basis. For example, the monitoring program can start a timer upon instantiation and, based upon a set time period, relay collected data to a remote site.

In some implementations, to access a remote site, the monitoring program can take advantage of cross-domain privileges to the first security context to access features built into the media player, such as routines, data classes, or programming objects. The monitoring program can use these media player features to open a secure network connection for transmitting the collected data. In other implementations, the monitoring program can use runtime environment features to open a network connection to a remote server.

Figure 3:
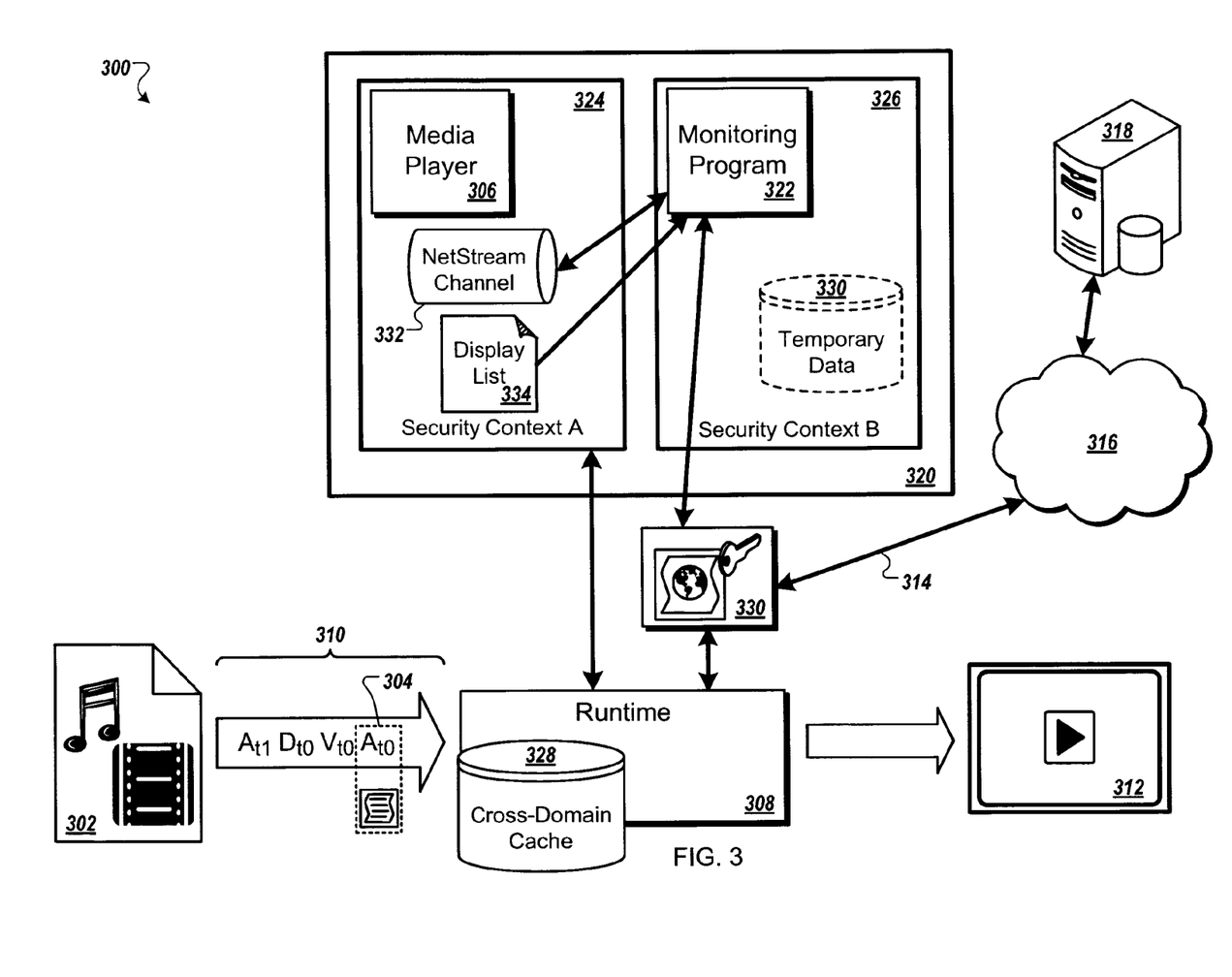
FIG. 3 is a block diagram showing an example of a software architecture and process of monitoring behavior with respect to a software application.

FIG. 3 is a block diagram showing an example of a software architecture and process 300 of monitoring behavior with respect to a software application. The process 300 involves a media player 306 that operates using a runtime environment 308 to render a multiplexed multimedia stream 310 of audio, video, and data content upon one or more output devices including a display 312. During rendering of media content 302, a monitoring program 322 can collect information regarding the consumption of the media content 302. The process 300 additionally uses a network connection 314 to a network 316. The process 300, for example, can be used to instantiate the monitoring program 322, which then monitors consumption of the media content 302 and supplies collected data to a data aggregation server system 318.

When a user interacts with the media player 306 to view the media content 302, the media player 306 issues a series of commands (e.g., play, seek, or stop) to the runtime environment 308. The runtime environment 308 (e.g., a Flash® runtime or an AIR® runtime environment provided by Adobe Systems Incorporated of San Jose, Calif.) receives the multimedia stream 310 of audio, video, and data content derived from the media content 302 (e.g., MP4, FLV, MPEG-2, or other multimedia content format) which is being rendered by the media player 306. The runtime environment 308 issues events and actions associated with the multimedia stream 310 to the media player 306. A first data packet within the multimedia stream 310 includes a trigger 304. The runtime environment 308 communicates information regarding the trigger 304 to the media player 306 or to a remote site available through the network connection 314 (e.g., within a secure data transmission 330). Although the network connection 314 is illustrated as a single point of connection between the secure data transmission 330 and the network 316, multiple local or remote network connections to one or more networked sites may be opened during the course of the process 300.

In some implementations, the trigger information is combined with information contributed by the media player 306 or the runtime environment 308 (e.g., a URL), and the combined monitoring program instantiation information is transmitted to a remote site via the network connection 314. In other implementations, the trigger 304 includes all information required to access and instantiate the monitoring program. The instantiation information can include, for example, a URL and information identifying a monitoring program version. The remote site, in some examples, can include multimedia servers within a content delivery network (CDN), a content provider network, or an Internet service provider network (ISP). For example, the remote site may include one or more data aggregation servers 318 for aggregating data (statistics) regarding the multimedia content 302.

The runtime environment 308 accesses the remote site referenced by the trigger 304 with the instantiation information. In some examples, the runtime environment 308 can download the monitoring program 322 from the remote site, or the runtime environment 308 can verify the version identification of a cached version of the monitoring program 322. In some implementations, information received by the remote site in response to the transmission of the trigger information can determine whether or not the runtime environment 308 will instantiate the monitoring program 322.

When the monitoring program 322 is instantiated, the monitoring program 322 runs within a cross-domain security context 326 of an execution environment 320. Instantiation of the monitoring program 322 within the cross-domain security context 326 provides the monitoring program 322 with special security privileges and the ability to access information in other security contexts, such as a media player security context 324. If more than one media player were instantiated within the execution environment 320, the monitoring program 322 can access information within each media player security context.

The cross-domain security context 326 can access a cross-domain cache 328 within the runtime environment 308. The cross-domain cache 328 remains even when there are no applications instantiated within the cross-domain security context 326. When downloaded from the network 316, the monitoring program 322 may be stored within the cross-domain cache 328. In this manner, even after terminating the instantiated monitoring program 322, the stored code can be perpetuated within the cross-domain cache 328 until the next time the monitoring program 322 is instantiated. Rather than storing the monitoring program 322 within the cross-domain cache, the monitoring program 322 may be downloaded from the network 316 each time a trigger is received by the runtime environment 308 to instantiate the monitoring program 322. Although the monitoring program 322 is stored within the cross-domain cache 328, in some implementations, the monitoring program 322 may not be invoked by other applications having access to the cross-domain cache 328. For example, a different application run within another security context can be prevented from loading and instantiating the monitoring program 322 from the cross-domain cache 328, and a software developer can be prevented from manually loading and instantiating the monitoring program 322 from the cross-domain cache 328.

The monitoring program can access a NetStream object 332 associated with the execution of the media player 306. The NetStream object 332 is a unidirectional streaming data channel between the media player 324 and the runtime environment 308 media server or the local file system through the runtime environment 308. The NetStream object 332 contains information related to the progress of the media content 302 as it is rendered by the media player 306. The NetStream object 332 can additionally contain metadata appended by the media player 306.

The monitoring program can additionally access a display list 334 associated with the rendering of the media content 302. The display list 334 includes a hierarchical tree structure of all visible objects within the media content 302. The formatting of the contents of the display list 334 may depend upon the coding of the media content 302. Some coding languages for media content may not include the generation of a display list.

During consumption of the media content 302, in some implementations, the monitoring program 322 can receive events and actions directly from the runtime environment 308. For example, one or more of the events, such as pause, seek, start, or stop, may be tracked by the monitoring program 322 through the runtime environment 308. In other implementations, the monitoring program 322 may only retrieve data from the media player security context 324.

In some implementations, media player 306 can communicate with monitoring program 322. If the media player 306 and the monitoring program 322 are coded in same language, such as AS bytecode, the media player 306 may be able to throw security objections during the rendering of the media content 302 depending upon the activities of monitoring program 322. Typically, however, the monitoring program 322 is aware of the media player 324, while the media player 324 is not aware of the activities of the monitoring program 322. Because the monitoring program 322 collects information regarding the rendering of the media content 302 without interaction from the media player 306, the monitoring program 322 may be unable to obtain certain information regarding the media content 302. For example, the monitoring program 322 may have no way of knowing where the media content 302 originated (e.g., the URL of the website accessed to retrieve the media content 302).

During the course of execution of the monitoring program 322, the monitoring program 322 collects information regarding the consumption of the media content 302. The monitoring program 322 can store the collected information within a temporary storage area 330 of the cross-domain security context 326. The temporary storage area 330, for example, can be a virtual storage allocated to the cross-domain security context 326.

In some implementations, the monitoring program 322 can aggregate data or perform some statistical analysis on data collected from multiple concurrently-running media player applications. For example, if two or more media player applications are instantiated within the execution environment 320, the monitoring program 322 can collect data regarding each media content item being rendered by each media player application and store the data within the temporary storage area 330. The media player applications may or may not be instantiated within the same security context.

The monitoring program 322 can utilize resources available through the runtime environment 308 and/or the media player 306 to provide secure data 330 through the network 316 to the data aggregation server 318 such as, for example, data regarding the viewing of the media content 302. In some implementations, the security privileges provided by the cross-domain security context 326 may allow the monitoring program 322 to bypass security checks when connecting to the network 316. In this manner, the user may remain unaware of the activities of the monitoring program 322.

The runtime environment 308 can impose various restrictions on any security context (324, 326) within the execution environment 320. For example, the runtime environment 308 can impose a restriction on the media player security context 324 which prevents any application running within the media player security context 324 from sending or receiving information from a domain accessible through the network 316 without first getting permission to do so from the target domain. The runtime environment 308 can eliminate or reduce this restriction for the cross-domain security context 326, allowing applications running within the cross-domain security context 326, such as the monitoring program 322, to send information to select domains or all domains over the network 316 without first obtaining permission from the target domain.

Figure 4:
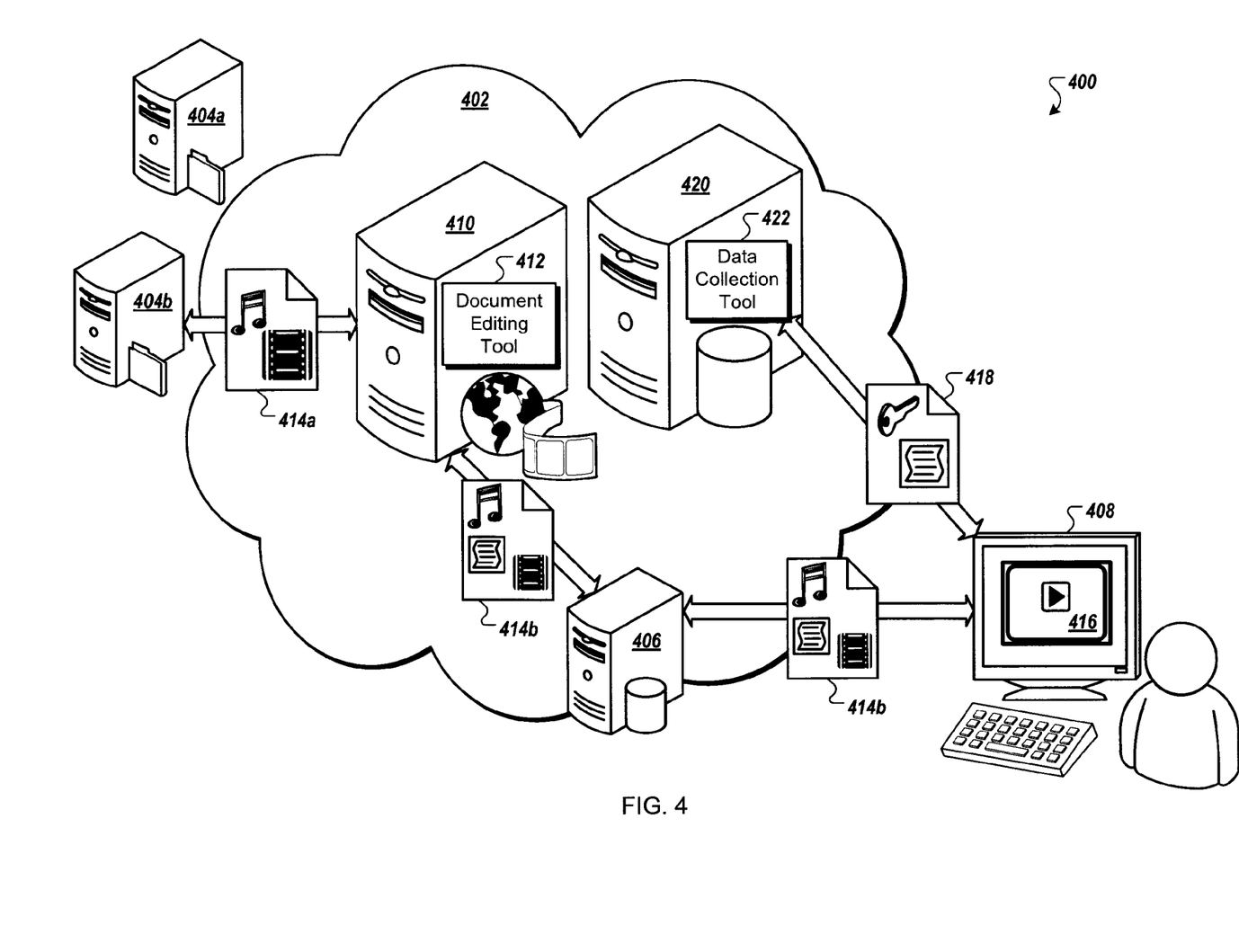
FIG. 4 is a block diagram showing another example of a computer system including one or more media player programs.

FIG. 4 is a block diagram showing another example computer system 400 including one or more media player programs 416. The computer system 400 includes a network 402 for sharing multimedia content. In some examples, the network 402 can represent the Internet, a content delivery network (CDN), a wide area network (WAN) or campus intranet, or a combination thereof.

Network 402, for example, can be used to distribute multimedia digital content through a network such as an internet service provider (ISP) network, a mobile device network, an Internet television (IPTV) broadcasting network, or other public or private digital network. The network 402 can receive content from content providers, for example from a first content provider server 404a or a second content provider server 404b. The content provider servers 404, in some examples, can be associated with film studios, record labels, television or cable TV providers, or advertisers.

The content which the content provider servers 404 deliver to the network 402 can include, in some examples, audio, visual, or multimedia digital content documents. Although the content provider servers 404 are illustrated as being outside the network 402, in some implementations one or more content provider servers 404 can be included within the network 402. For example, a cable TV provider can have an IPTV CDN including one or more content provider servers for generating TV content. Advertisements can be received from one or more advertisement content provider servers outside of the IPTV CDN and combined with the content generated by the IPTV CDN.

The network 402 can distribute content received from the content provider servers 404 to one or more content storage servers such as a content storage server system 406 (e.g., a server computer or server cluster). In some implementations, the network 402 can have any number of (physically distributed) content storage servers 406 to replicate multimedia content and to distribute this content to the user base of the network 402.

The user base of the network 402 can include any number or variety of user devices, such as, in some examples, personal computers, smartphones, personal digital assistants (PDAs), or notebook computers. The network 402, for example, includes a user connected via a personal computer (PC) user device 408. The user device 408 can connect to the network 402 in a wireless or wired manner. In some cases, the user device 408 can access the network 402 via an Internet browser. In some implementations, the user device 408 can be used for uploading content to the network 402 as well as for receiving content from the network 402.

The network 402 includes a media server system 410 (e.g., a server computer or server cluster) which contains a document editing tool 412. The media server system 410, for example, can be accessed by an authorized user to modify digital content or to generate new digital content using the document editing tool 412. In some implementations, the document editing tool 412 can be used to modify digital content which the network 402 has received from one or more of the content provider servers 404. For example, the media server system 410 can receive a digital content document 414a directly from the content provider server 404b or retrieve a copy of the digital content document 414a which the network 402 received from the content provider server 404b and stored within the content storage server system 406. The document editing tool 412 can be used, for example, to introduce information into the associated data section of the digital content document 414a used to trigger a monitoring program.

The document editing tool 412 produces a modified electronic document 414b which can be distributed directly to the user device 408 by the media server system 410 or copied to the storage server system 406. The electronic document 414a, in some implementations, can be retrieved from the content provider server 404b or the content storage server system 406, modified to introduce the trigger information, which can be referenced within the associated data or fully embedded as bytecode within the associated data, and the modified electronic document 414b can be delivered to the requesting user device 408 in real time. In some implementations, the network 402 can include any number of media servers that modify and distribute digital content. For example, each content storage server within the network 402, such as the content storage server system 406, can include a copy of the document editing tool 412.

After the user device 408 has received the modified electronic document 414b, the document 414b can be rendered by the media player 416. The monitoring program, instantiated using information introduced within the trigger added by the document editing tool 412, can be executed by a runtime environment operating beneath the media player 416.

If the monitoring program has not yet been downloaded to the user device, a referenced monitoring program 418 can be downloaded from a data aggregation server system 420 (e.g., a server computer or server cluster), the media server system 410, the content storage server system 406, or another device connected to the network 402. Information directing the user device 408 (e.g., computer instructions useable by the run time environment, the media player 416, or other software installed within the user device 408) to the location of a downloadable copy of the monitoring program can be included within the modified electronic document 414b, the media player 416, and/or the runtime environment operating beneath the media player 416. For example, the modified electronic document 414b can include information that can be appended to a URL hard-coded within the media player 416.

In some implementations, instructions within the monitoring program can include calls to communicate with the data aggregation server system 420. The media player 416 and/or a runtime environment operating beneath the media player 416, for example, can provide actions and events (e.g., regarding the performance of the media player 416, user inputs to the media player 416, etc.) to the monitoring program. The monitoring program can collect data during the rendering of the modified electronic document 414b based upon the received actions and events. The data, for example, can include information indicating one or more actions taken by a user during the rendering of the modified electronic document 414b. In some examples, the information can include identification of the type of media player being used to render the modified electronic document 414b, identification of the portion of the media content displayed (e.g., the first 120 frames, the full video, etc.), identification of any portion(s) of the media content played more than once by the user, or identification of any portion(s) of the media content paused upon by the user. Each action or event collected as data, in some implementations, can be associated with a time stamp indicating when the data was collected. The collected data can, in further examples, include metadata associated with the media data rendered such as, in some examples, information identifying the media content, information identifying sections of the media content (e.g., one or more advertisements appended within a video content), quality of service (QOS) settings associated with the rendering of the media content, media player settings during rendering of the media content (e.g., full screen mode, subtitles, volume level, mute, etc.) or bookmarks associated with the media content.

The collected data can be provided to the data aggregation server system 420 from the user device 408 (e.g., on a scheduled basis, when the file(s) associated with the modified electronic document 414b are closed, upon one or more user actions such as stopping or pausing the rendering of the video content). The collected data can include one or more keys to identify the source of the data (e.g., identifying the modified electronic document 414b, the media player 416, the user device 408, the runtime environment, or the user). Other categories of data can be provided which may aide in aggregating the collected data to generate statistics. For example, the collected data can include time zone, regional, geographical, and/or date information.

Within the data aggregation server system 420, a data collection tool 422 can aggregate the collected data with other data related to the same or similar source (e.g., same video, same television series, same advertisement(s), etc.). In some implementations, the data collection tool 422 may also analyze statistics derived from the aggregated data.

The aggregated data and/or the derived statistics, in some implementations, can be provided to other devices within the network 402. For example, the data aggregation server system 420 can supply statistics to the content provider servers 404. The content provider servers 404 may use the statistics to refine media content such as the electronic document 414a.

Although the media server system 410, the content storage server system 406, and the data aggregation server system 420 are illustrated as individual network devices, in some implementations the functionality of each server system 410, 406, and/or 420 can be combined within one or two network devices. The network 402 can include any number of content storage servers, data aggregation servers, and/or media servers.

Figure 5:
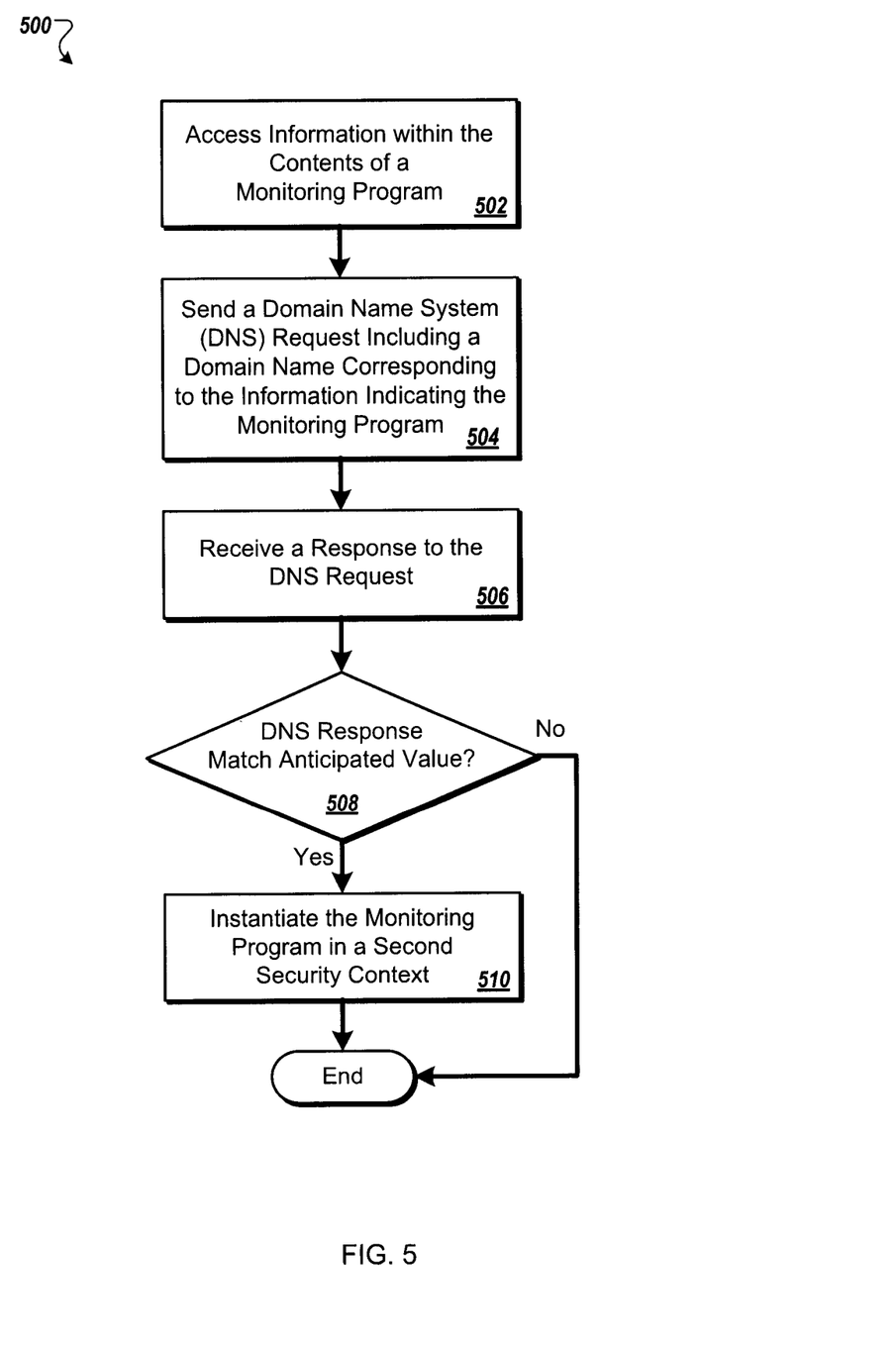
FIG. 5 is a flowchart showing an example of process of controlling instantiation of a monitoring program using a domain name system (DNS) request.

FIG. 5 is a flowchart showing an example of a process 500 for controlling the instantiation of a monitoring program using a Domain Name System (DNS) request. The process 500, for example, may be executed within a runtime environment in which a monitoring program, such as the monitoring program 322 as described in relation to FIG. 3, is stored. The process 500 may be used, for example, to verify that the version of a stored monitoring program matches the most recent version. In another example, the process 500 may be used to activate and deactivate the performance of the monitoring program.

The process 500 begins with accessing information within the contents of a monitoring program (502). The information includes at least a portion of a domain name identifier uniquely identifying the version of the monitoring program. For example, the domain name identifier may include a version sub-domain, a program sub-domain, and a program manufacturer domain, such as "version4.monitorprogram.monitorcompany.com". The information within the contents of the monitoring program may include the version sub-domain information (e.g., version4), which can be appended to the remaining domain name information (e.g., monitorprogram.monitorcompany.com") which can be stored within the runtime environment or the media player program.

A DNS request is sent, including a domain name corresponding to the information indicating the monitoring program (504). The DNS request, for example, may be sent by the runtime environment through a network connection.

A response to the DNS request is received (506). The response to the DNS request, in general, conveys an internet protocol (IP) address corresponding to the requested domain name. If no IP address is located for a particular domain name, the DNS response denotes an unreachable domain. The DNS response may additionally include status flags or other information.

If the DNS response does not match an anticipated value (508), the process 500 ends. In some implementations, if a response of unreachable is obtained, the process 500 may presume that the monitoring program should not be instantiated. In addition, other information, such as flag settings within the DNS response or information encoded into the IP address can be used to determine how to control the instantiation. For example, a made up IP address, which is not a valid IP address, can be used to indicate the current version of the monitoring program, such as 127.255.a.b to indicate an initial version and 127.255.a.c to indicate a new version of the monitoring program. Such information can correspond to one or more values anticipated as possible responses to the DNS request.

If the DNS response does match an anticipated value (508), the monitoring program is instantiated in a second security context (510). For example, the runtime environment 308 can instantiate the monitoring program 322 into the cross-domain security context 326 from bytecode stored within the cross-domain cache 328 (as described in relation to FIG. 3). In some implementations, the process 500 can proceed to replace the monitoring program with a new version, depending upon the contents of the DNS response. For example, information within the DNS response flags or the returned IP address can notify the process 500 that a newer version of the monitoring program is available.

Figure 6:
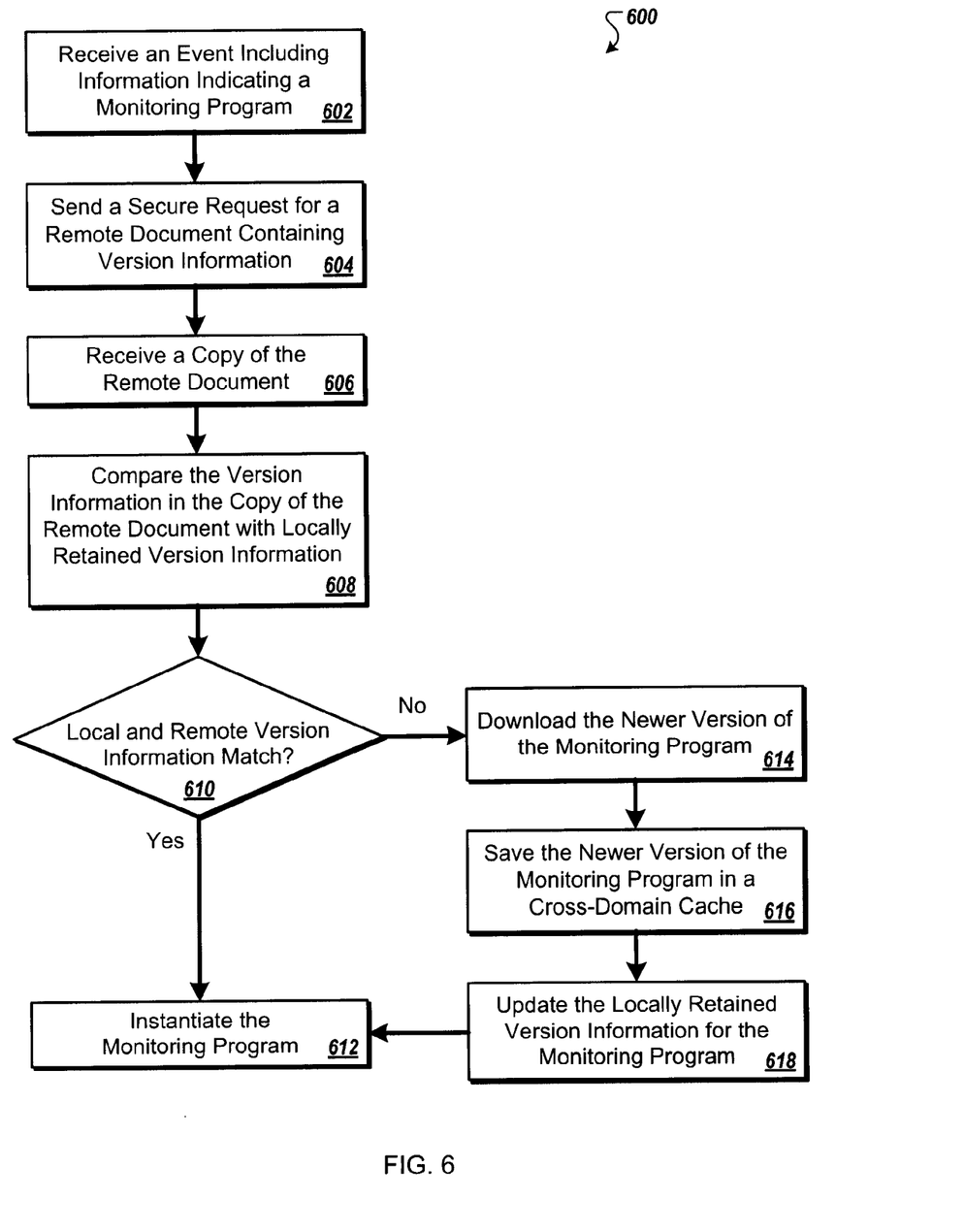
FIG. 6 is a flowchart showing an example of process of version checking and updating of a monitoring program.

FIG. 6 is a flowchart showing an example of process 600 of version checking and updating of a monitoring program. The process 600, for example, can be executed within a runtime environment in which a monitoring program, such as the monitoring program 322 as described in relation to FIG. 3, is stored. The process 600 can be used, for example, to verify that the version of a stored monitoring program matches the most recent version and, if not, to obtain the most recent version of the monitoring program prior to instantiation. In some implementations, the runtime environment 308 executes the process 600 based upon the trigger 304 received within the media content 302 and, optionally, additional information retrieved from the media player 306 or the runtime environment 308 (as described in relation to FIG. 3).

The process 600 begins with receiving an event including information indicating a monitoring program (602). The event, for example, can be a trigger embedded within media content. The trigger, in some examples, can include a URL where the monitoring program can be accessed or information which can be provided to a known URL (e.g., a URL coded into the media player or the runtime environment).

A secure request is sent for a remote document containing version information (604). The remote document can be stored within a server accessible via a network connection. For example, the runtime environment 308 may access the remote document via the network 316 using a Hypertext Transfer Protocol Secure (HTTPS) download. A copy of the remote document is received (606). In some examples, the remote document may be downloaded using HTTPS, Secure Hypertext Transfer Protocol (S-HTTP), Secure Shell File Transfer Protocol (SFTP), or FTP Secure (FTPS). For example, the remote document can be an XML (eXtensible Markup Language) document hosted on a secure web server, where this XML document contains the current version of the monitoring program (e.g., a monitoring SWF).

The version information in the copy of the remote document is compared with locally retained version information (608). The locally retained version information can be stored within the local copy of the monitoring program or separate from the local copy of the monitoring program. For example, the locally retained version information can be stored within the bytecode of the monitoring program as a SWF metadata tag. In another example, the locally retained version information can be stored within a file separate from the monitoring program, such as an XML document. In some implementations, the latest version of the monitoring program and the last update check time can be stored in settings information of a runtime environment in which the monitoring program runs.

If the local version information matches the remote version information (610), the monitoring program is instantiated (612). For example, the monitoring program 322 can be loaded from the bytecode stored within the cross-domain cache 328. In some implementations, the file name of the monitoring program (e.g., the monitoring SWF) in the cross-domain cache 328 is composed of the SHA256 digest of its version. If there is a miss in cross-domain cache 328, a new version of monitoring program can be downloaded from a website and saved in the cross-domain cache 328 (with the name formed from the SHA256 digest of its version) for future use. If there is a hit in cross-domain cache 328, the monitoring program can be loaded from the cross-domain cache 328. Moreover, to further increase security, the monitoring program can have its local version information (e.g., stored in a metadata tag), which can be checked against other local version information (e.g., stored settings information of the runtime environment) during loading of the monitoring program. If the two sets of version information do not match, the cached program can be marked as invalid, the loading can be aborted, and the monitoring program can be deleted from the cross-domain cache 328.

If the local version information does not match the remote version information (610), a newer version of the monitoring program is downloaded (614). For example, the monitoring program can be downloaded from the URL provided within the monitoring program event trigger, or the combined URL information retrieved from both the trigger and information hardcoded within the runtime environment or the media player. Upon download, the newer version of the monitoring program is saved in a cross-domain cache (616). In addition, in some implementations, the monitoring program update can be limited to allow only increasing version numbers for the monitoring program, thus preventing updating to an older version.

The locally retained version information for the monitoring program is updated (618). In some implementations, the locally retained version information is downloaded as part of the monitoring program download. In other implementations, the separately stored monitoring program version information can be updated based upon the contents of the remote document previously retrieved. Once the monitoring program has been updated to the most recent version, the monitoring program is instantiated (612).

In other implementations, the remote document may be downloaded periodically and stored (e.g., within the cross-domain cache). Either upon downloading or prior to instantiation, the version information in the cached copy of the remote document can be compared to the locally retained version information. In this manner, the monitoring program can be upgraded to the most recent version during a time when there is a lower demand for network and/or local processing resources.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    receiving in a multi-media stream information indicating a monitoring program, the multi-media stream including media content;
    playing the media content using a first program that is limited to a first security context corresponding to a first domain of the first program, the first program having an object in the first security context corresponding to the media content;
    receiving an event from the multi-media stream information comprising information indicating the monitoring program;
    instantiating the monitoring program in a second security context that is applicable to multiple domains, including the first domain, the instantiated monitoring program having access from the second security context to the object of the first program in the first security context; and
    receiving from the monitoring program information regarding playing of the media content.

2. The method of claim 1, comprising:
    providing the instantiated monitoring program in the second security context with access to a display list of the first program in the first security context; and
    allowing the instantiated monitoring program in the second security context to send information to domains other than the first domain.

3. The method of claim 1, comprising:
    sending a domain name service (DNS) request including a domain name corresponding to the information indicating the monitoring program;
    receiving a response to the DNS request; and
    controlling the instantiating based on the response.

4. The method of claim 1, comprising:
    sending a secure request for a remote document containing version information;
    receiving a copy of the remote document;
    comparing the version information in the copy of the remote document with locally retained version information for the monitoring program;
    when the comparing indicates a newer version of the monitoring program is available
        downloading the newer version of the monitoring program,
        saving the newer version of the monitoring program in a cross-domain cache serving as a source for the instantiating, and updating the locally retained version information for the monitoring program; and controlling the instantiating based on a match between the locally retained version information for the monitoring program and version information contained within the monitoring program.

5. The method of claim 1, where the first program comprises bytecode of a first type, and the monitoring program comprises bytecode of the first type;

the method comprising providing a network connection to the monitoring program through which the information is received and forwarded over a network to another computer for aggregation and analysis; and where playing the media content, receiving the event, instantiating the monitoring program, and providing the network connection are performed by a runtime environment in which a media player application operates.

6. A computer storage medium encoded with a computer program, the program comprising instructions that when executed by data processing apparatus cause the data processing apparatus to perform operations comprising:

receiving in a multi-media stream information indicating a monitoring program, the multi-media stream including media content;

playing the media content using a first program that is limited to a first security context corresponding to a first domain of the first program, the first program having an object in the first security context corresponding to the media content;

receiving an event from the multi-media stream information comprising information indicating the monitoring program;

instantiating the monitoring program in a second security context that is applicable to multiple domains, including the first domain, the instantiated monitoring program having access from the second security context to the object of the first program in the first security context; and receiving from the monitoring program information regarding playing of the media content.

7. The computer storage medium of claim 6, the operations comprising:

providing the instantiated monitoring program in the second security context with access to a display list of the first program in the first security context; and allowing the instantiated monitoring program in the second security context to send information to domains other than the first domain.

8. The computer storage medium of claim 6, the operations comprising:

sending a domain name service (DNS) request including a domain name corresponding to the information indicating the monitoring program;

receiving a response to the DNS request; and controlling the instantiating based on the response.

9. The computer storage medium of claim 6, the operations comprising:

sending a secure request for a remote document containing version information;

receiving a copy of the remote document;

comparing the version information in the copy of the remote document with locally retained version information for the monitoring program;

when the comparing indicates a newer version of the monitoring program is available downloading the newer version of the monitoring program, saving the newer version of the monitoring program in a cross-domain cache serving as a source for the instantiating, and updating the locally retained version information for the monitoring program; and controlling the instantiating based on a match between the locally retained version information for the monitoring program and version information contained within the monitoring program.

10. The computer storage medium of claim 6, where the first program comprises bytecode of a first type, and the monitoring program comprises bytecode of the first type;

the operations comprising providing a network connection to the monitoring program through which the information is received and forwarded over a network to another computer for aggregation and analysis; and where playing the media content, receiving the event, instantiating the monitoring program, and providing the network connection are performed by a runtime environment in which a media player application operates.

11. A system comprising:

a device; and one or more computers operable to interact with the device and to perform operations comprising:

receiving in a multi-media stream information indicating a monitoring program, the multi-media stream including media content;

playing the media content using a first program that is limited to a first security context corresponding to a first domain of the first program, the first program having an object in the first security context corresponding to the media content;

receiving an event from the multi-media stream information comprising information indicating the monitoring program;

instantiating the monitoring program in a second security context that is applicable to multiple domains, including the first domain, the instantiated monitoring program having access from the second security context to the object of the first program in the first security context; and receiving from the monitoring program information regarding playing of the media content.

12. The system of claim 11, the operations comprising:

providing the instantiated monitoring program in the second security context with access to a display list of the first program in the first security context; and allowing the instantiated monitoring program in the second security context to send information to domains other than the first domain.

13. The system of claim 11, the operations comprising:

sending a domain name service (DNS) request including a domain name corresponding to the information indicating the monitoring program;

receiving a response to the DNS request; and controlling the instantiating based on the response.

14. The system of claim 11, the operations comprising:

sending a secure request for a remote document containing version information;

receiving a copy of the remote document;

comparing the version information in the copy of the remote document with locally retained version information for the monitoring program;

when the comparing indicates a newer version of the monitoring program is available downloading the newer version of the monitoring program, saving the newer version of the monitoring program in a cross-domain cache serving as a source for the instantiating, and updating the locally retained version information for the monitoring program; and controlling the instantiating based on a match between the locally retained version information for the monitoring program and version information contained within the monitoring program.

15. The system of claim 11, where the first program comprises bytecode of a first type, and the monitoring program comprises bytecode of the first type;

the operations comprising providing a network connection to the monitoring program through which the information is received and forwarded over a network to another computer for aggregation and analysis; and where playing the media content, receiving the event, instantiating the monitoring program, and providing the network connection are performed by a runtime environment in which a media player application operates.

16. The system of claim 11, wherein the device comprises a mobile telephone comprising the one or more computers.

17. The system of claim 11, wherein the one or more computers consist of one computer, the device is a user interface device, and the one computer comprises the user interface device.

* * * * *